(12) United States Patent
Willey et al.

(10) Patent No.: US 11,105,385 B2
(45) Date of Patent: Aug. 31, 2021

(54) TWIN PISTON CALIPER WITH ELECTRIC PARKING BRAKE AND METHOD OF OPERATING SUCH A TWIN PISTON CALIPER WITH ELECTRIC PARKING BRAKE

(71) Applicant: ZF Active Safety US Inc., Livonia, MI (US)

(72) Inventors: Joseph Willey, Canton, MI (US); Manuel Barbosa, Novi, MI (US)

(73) Assignee: ZF Active Safety US Inc., Livonia, MI (US)

( * ) Notice: Subject to any disclaimer, the term of this patent is extended or adjusted under 35 U.S.C. 154(b) by 5 days.

(21) Appl. No.: 16/785,037

(22) Filed: Feb. 7, 2020

(65) Prior Publication Data

US 2020/0256411 A1 Aug. 13, 2020

Related U.S. Application Data

(60) Provisional application No. 62/803,863, filed on Feb. 11, 2019.

(51) Int. Cl.
*F16D 65/28* (2006.01)
*F16D 65/00* (2006.01)
(Continued)

(52) U.S. Cl.
CPC ........ *F16D 65/0068* (2013.01); *B60T 13/588* (2013.01); *B60T 13/741* (2013.01);
(Continued)

(58) Field of Classification Search
CPC ........ B60T 13/741; F16D 55/24; F16D 55/32; F16D 65/16; F16D 65/18; F16D 65/183;
(Continued)

(56) References Cited

U.S. PATENT DOCUMENTS

| | | |
|---|---|---|
| 998,914 A | 7/1911 | McArthur |
| 9,353,811 B2 | 5/2016 | Gutelius et al. |

(Continued)

*Primary Examiner* — Nicholas J Lane
(74) *Attorney, Agent, or Firm* — Robert James Harwood

(57) ABSTRACT

A twin piston caliper with an electric parking brake and method of operating such a twin piston caliper with an electric parking brake. The twin piston caliper housing comprises two separate inner brake pads for each of the two pistons; one outer brake pad at the outer housing finger area; an electric parking brake mechanism configured to be incorporated in between the two pistons so that it is not embedded in the hydraulic piston and not the hydraulic brake fluid; and wherein the electric parking brake mechanism uses its own electric parking brake friction brake pad to clamp against the brake rotor. The method of operating the twin piston caliper with the electric parking brake comprising the following steps: using hydraulic pressure, preferably high pressure overlay, to clamp up inner brake pads and the outer brake pad against a brake rotor; applying the electric parking brake mechanism to clamp an electric parking brake friction brake pad against the brake rotor; releasing the hydraulic pressure to unclamp the two inner brake pads whereby the electric parking brake mechanism maintains the clamp between the outer brake pad and the electric parking brake friction brake pad.

2 Claims, 1 Drawing Sheet

(51) Int. Cl.
*B60T 13/58* (2006.01)
*B60T 13/74* (2006.01)
*F16D 121/24* (2012.01)
*F16D 125/10* (2012.01)
*F16D 121/04* (2012.01)
*F16D 123/00* (2012.01)

(52) U.S. Cl.
CPC ...... *F16D 2121/04* (2013.01); *F16D 2121/24* (2013.01); *F16D 2123/00* (2013.01); *F16D 2125/10* (2013.01)

(58) Field of Classification Search
CPC ............. F16D 65/14; F16D 2055/0091; F16D 2123/00; F16D 2131/00
See application file for complete search history.

(56) References Cited

U.S. PATENT DOCUMENTS

| | | | |
|---|---|---|---|
| 9,644,693 B2 | 5/2017 | Chelaidite et al. | |
| 9,752,635 B2 | 9/2017 | Bahmata et al. | |
| 9,879,739 B2 | 1/2018 | Gutelius et al. | |
| 2010/0032250 A1* | 2/2010 | Cantoni | F16D 55/228 188/72.3 |
| 2013/0277158 A1* | 10/2013 | Previtali | F16D 65/0075 188/73.47 |
| 2015/0001010 A1* | 1/2015 | Liao | F16D 65/18 188/72.3 |
| 2015/0027821 A1* | 1/2015 | Nessi | F16D 65/0975 188/72.3 |
| 2015/0267767 A1* | 9/2015 | Liao | B60T 13/741 188/72.1 |
| 2017/0130788 A1* | 5/2017 | Noguchi | F16D 55/226 |
| 2017/0335908 A1* | 11/2017 | Liao | B60T 13/741 |
| 2018/0031060 A1* | 2/2018 | Huang | B60T 13/588 |
| 2018/0135711 A1 | 5/2018 | Chelaidite et al. | |
| 2019/0389444 A1* | 12/2019 | Kistner | B60T 13/662 |
| 2020/0141456 A1* | 5/2020 | Zenzen | F16D 65/0093 |

\* cited by examiner

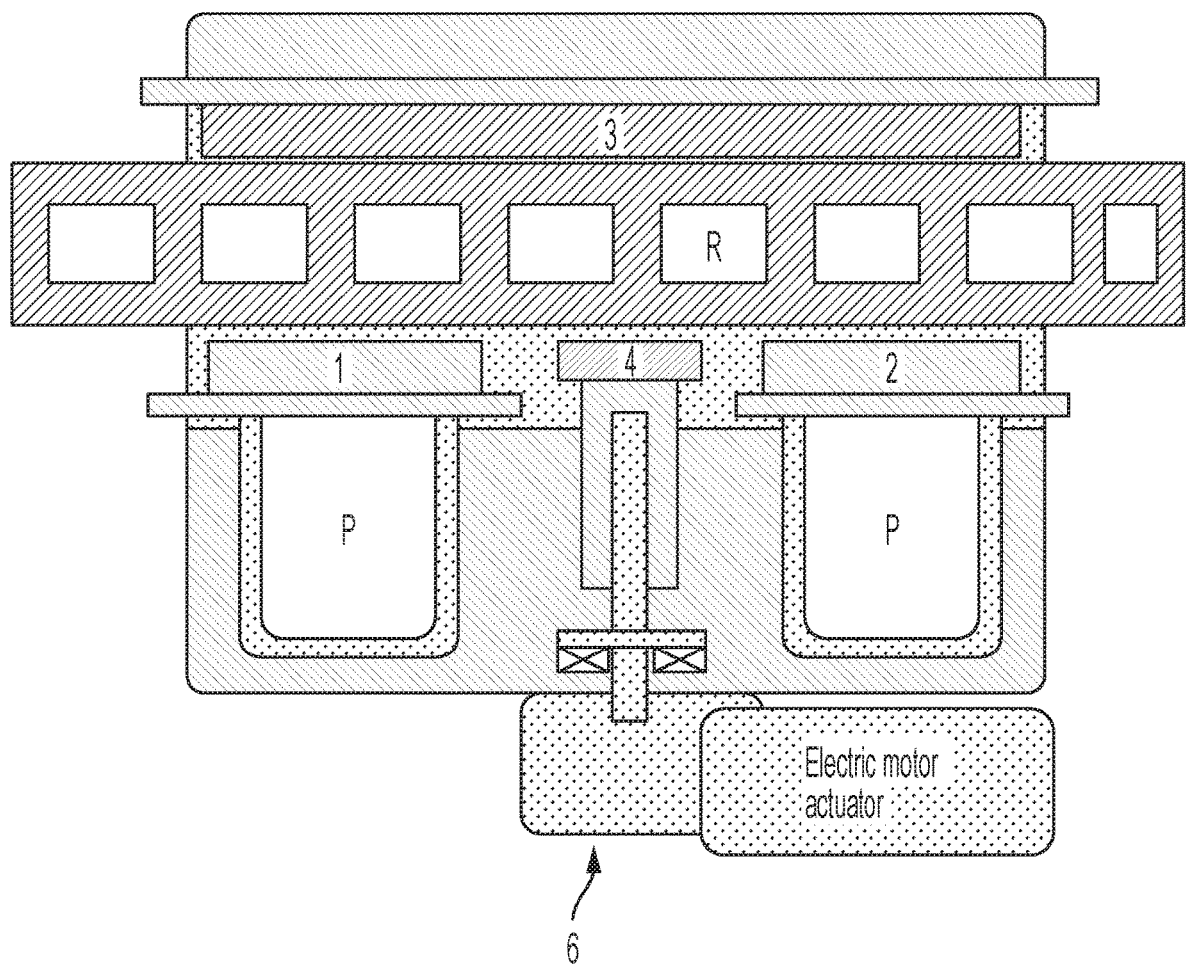

TWIN PISTON CALIPER WITH ELECTRIC PARKING BRAKE AND METHOD OF OPERATING SUCH A TWIN PISTON CALIPER WITH ELECTRIC PARKING BRAKE

CROSS-REFERENCE TO RELATED APPLICATIONS

This application claims priority to U.S. Provisional Patent Application No. 62/803,863, filed Feb. 11, 2019, the present disclosure of which is incorporated herein by reference in its entirety.

BACKGROUND

This invention relates in general to vehicle disc brake assemblies and in particular to an improved twin piston caliper with an electric parking brake and method of operating such a twin piston caliper with an electric parking brake.

Current electric parking brake (EPB) caliper applications are limited to a single piston hydraulic calipers. This limitation of the rear caliper piston size limits the maximum vehicle weight that can utilize an EPB caliper. A known example is the single 54 EPB caliper used on the Ford F150 truck. Larger vehicles such as the F250/350 trucks utilize twin piston calipers for hydraulic braking. These vehicles would require EPB calipers that would apply two pistons for parking brake clamping (e.g., 2×45 or 2×51). This would require special mechanisms/gearing to achieve the clamping of the two pistons. The extra gearing and/or actuator becomes costly.

The use of larger diameter pistons are not feasible because of the limited packaging space for the rear caliper. For example a 2/51 rear caliper would requires a single piston diameter of 72 mm. The packaging of a 72 mm piston would reduce the effective radius of the caliper and cause large overhang of the piston to the brake pad. The packaging of the EPB spindle and nut into the large piston would also be problematic.

SUMMARY OF INVENTION

A features of the invention is to utilize an EPB mechanism within a twin piston caliper that function separately from the hydraulic pistons. The caliper would utilize high pressure overlay (HPO) to preload the housing and pads thereby increasing the nominal clamp force for parking.

According to the invention, the twin piston caliper housing includes two separate inner brake pads for each of the two pistons and one "large" outer brake pad at the outer housing finger area. The EPB apply mechanism is incorporated in between the two pistons so that it is not embedded in the hydraulic piston and not the hydraulic brake fluid. The EPB apply mechanism shall use its own "small" EPB friction brake pad to clamp against the brake rotor.

The operation of the twin piston caliper brake is as follows. Use HPO to clamp up the inner brake pads and the outer brake pad against the brake rotor R. Next, apply the EPB apply mechanism to clamp the small friction brake pad against the brake rotor. Then, release the hydraulic pressure to unclamp the two inner brake pads. The final outcome is the EPB apply mechanism maintains the clamp between the large outer brake pad and the small inner EPB brake pad.

One or more potential and/or realized benefits of the invention are as follows. 1. Separated EPB apply mechanism from the hydraulic pistons. 2. With no hydraulic fluid, now able to improve lubrication of the EPB apply mechanism by using a suitable lubricant, such as grease. 3. With no hydraulic fluid, it is easier to seal the EPB apply mechanism. 4. Able to use higher friction brake pad for the EPB apply mechanism. 5. Able to increase the final EPB clamp force by preloading the housing with HPO. 6. Reduced caliper service braking noise, (such as for example squeal, by using dissimilar service pads between piston and finger end of the caliper. Other advantages of this invention will become apparent to those skilled in the art from the following detailed description of the preferred embodiments, when read in light of the accompanying drawings.

BRIEF DESCRIPTION OF DRAWINGS

FIG. 1 is a view of an embodiment of a twin piston caliper with EPB in accordance with the present invention.

DETAILED DESCRIPTION OF THE PREFERRED EMBODIMENTS

FIG. 1 illustrates an EPB mechanism within a twin piston caliper housing that function separately from the hydraulic pistons. As shown therein, the twin piston caliper housing includes two separate inner brake pads 1, 2 for each of the two pistons P and one "large" outer brake pad 3 at the outer housing finger area. The EPB apply mechanism 6 is incorporated in between the two pistons 1, 2 so that it is not embedded in the hydraulic piston and not the hydraulic brake fluid. The EPB apply mechanism 6 uses its own "small" EPB friction brake pad 4 to clamp against the brake rotor R.

The operation of the twin piston caliper brake is as follows. Use HPO to clamp up the inner brake pads 1, 2 and the outer brake pad 3. Next, apply the EPB apply mechanism 6 to damp the small friction brake pad 4 against the brake rotor R. Then, release the hydraulic pressure to unclamp the two inner brake pads 1,2. The final outcome is the EPB apply mechanism 6 maintains the clamp between the large outer brake pad 3 and the small hmer EPB brake pad 4.

One or more potential and/or realized benefits of the invention are as follows. 1. Separated EPB apply mechanism 6 from the hydraulic pistons. 2. With no hydraulic fluid, now able to improve lubrication of the EPB apply mechanism 6 by using a suitable lubricant, such as grease. 3. With no hydraulic fluid, it is easier to seal the EPB apply mechanism 6. 4. Able to use higher friction brake pad 4 for the EPB apply mechanism. 5. Able to increase the final EPB clamp force by preloading the housing with HPO. 6. Reduced caliper service braking noise, (such as for example squeal, by using dissimilar service pads between piston and finger end of the caliper.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method of operating a twin piston caliper with an electric parking brake comprising the following steps:
   using hydraulic pressure to clamp up inner brake pads and an outer brake pad against a brake rotor;
   applying the electric parking brake mechanism to clamp an electric parking brake friction brake pad against the brake rotor; and releasing the hydraulic pressure to unclamp the two inner brake pads whereby the electric parking brake mechanism maintains the clamp between the outer brake pad and the electric parking brake friction brake pad.

2. The method recited in claim 1, wherein high pressure overlay is used to clamp up the inner brake pads and the outer brake pad against the brake rotor.

\* \* \* \* \*